(12) United States Patent
Norihisa

(10) Patent No.: US 8,419,551 B2
(45) Date of Patent: Apr. 16, 2013

(54) ROTARY SHAFT DEVICE

(75) Inventor: Takashi Norihisa, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 15 days.

(21) Appl. No.: 13/093,071

(22) Filed: Apr. 25, 2011

(65) Prior Publication Data

US 2011/0281658 A1 Nov. 17, 2011

(30) Foreign Application Priority Data

May 17, 2010 (JP) .................................. 2010-113457

(51) Int. Cl.
*F16L 27/08* (2006.01)

(52) U.S. Cl.
USPC .......................................................... 464/18

(58) Field of Classification Search ................ 464/2, 17, 464/18, 24, 25, 179; 285/120.1, 121.1, 121.3, 285/121.6; *F16L 27/08*
See application file for complete search history.

(56) References Cited

U.S. PATENT DOCUMENTS

| 3,950,017 A * | 4/1976 | Beurer ................... 285/121.6 X |
| 2008/0093842 A1 * | 4/2008 | Kuhner et al. |
| 2010/0109320 A1 * | 5/2010 | Davies et al. .............. 285/120.1 |

FOREIGN PATENT DOCUMENTS

| DE | 19916106 A1 * | 10/2000 |
| JP | 51-100323 A1 | 9/1976 |

\* cited by examiner

*Primary Examiner* — Gregory Binda
*Assistant Examiner* — Matthieu Setliff
(74) *Attorney, Agent, or Firm* — Burr & Brown

(57) ABSTRACT

In a rotary joint for a rotary shaft device, ring-shaped inner seals and outer seals are projectingly arranged, and concentric with faces of a front joint disk and a rear joint disk opposing with each other respectively. A ring-shaped inner space communicates with forward communication holes, and a ring-shaped outer space communicates with backward communication holes. The inner and outer space are adjacently arranged concentrically between the inner seals and the outer seals. The forward communication holes and the backward communication holes in the reciprocating flow passages and the front joint disk are arranged at an equal distance in the peripheral direction of the opposing faces.

8 Claims, 10 Drawing Sheets

ROTARY SHAFT DEVICE

This application claims the entire benefit of Japanese Patent Application Number 2010-113457 filed on May 17, 2010, the entirety of which is incorporated by reference.

BACKGROUND OF THE INVENTION

1. Field of the Invention

The present invention relates to a rotary shaft device arranged in a main spindle of a machine tool and the like and rotatably supporting a rotary shaft including reciprocating flow passages for fluid.

2. Description of the Related Art

In a main spindle for a machine tool for example, reciprocating flow passages for fluid are arranged inside a rotary shaft for the purpose of cooling, and it is configured to supply the reciprocating flow passages with fluid through a rotary joint. With regard to the rotary joint, as described in JP-A-S51-100323, a structure is known in which a plurality of annular oil passage grooves are formed concentrically between end faces of a pair of disks facing with each other. Further, O-rings are provided between the adjacent annular oil passage grooves, and passage openings connected to each annular oil passage groove are opened in the outer end surface of the each disk to allow the fluid to be supplied.

However, the rotary joint described in JP-A-S51-100323 is of a one-way structure in which the fluid passes from one disk to the other disk. Therefore, it is difficult to apply the known structure to a rotary shaft provided with reciprocating flow passages inside thereof such as a main spindle of a machine tool. In particular, when the rotary shaft provided with the reciprocating flow passages rotates at a high speed, the fluid pressure increases inside the joint on the discharge side because of the pressure caused by the difference in the radius of a forward passage and a backward passage. As a result, the internal pressure of the rotary joint increases, which may lead to fluid leaking. On the other hand, the drastic drop of the fluid pressure inside the forward passage or inside the joint may cause an occurrence of cavitation.

Under such circumstances, the object of the present invention is to provide a rotary shaft device capable of inhibiting an occurrence of leakage and supplying fluid stably even if a rotary shaft provided with reciprocating flow passages for fluid rotates at a high speed.

In order to achieve the object, a first aspect of the present invention is a rotary shaft device including a rotary joint having a front joint disk and a rear joint disk. The front joint disk is arranged in a rear end face of a rotary shaft, which is provided with reciprocating flow passages. The rear joint disk is arranged so as to oppose the front joint disk and capable of being pressed against the front joint disk by a pressing part at a predetermined pressure. The front joint disk and the rear joint disk are provided with forward communication holes connected to a forward passages side of the reciprocating flow passages, and backward communication holes connected to a backward passages side of the reciprocating flow passages respectively.

Further, either the front joint disk or the rear joint disk opposing with each other has a ring-shaped inner seal projecting and abutting upon the opponent face on the axis side of the joint disk in the pressing state by the pressing part. Either the front joint disk or the rear joint disk opposing with each other also has a ring-shaped outer seal projecting, positioned concentrically with the inner seal, and abutting upon the opponent face on the outer periphery side of the joint disk in the pressing state by the pressing part.

A ring-shaped inner space and a ring-shaped outer space are adjacently arranged concentrically with each other between the inner seal and the outer seal. The ring-shaped inner space communicates with the forward communication holes or the backward communication holes. The ring-shaped outer space also communicates with the forward communication holes or the backward communication holes. The forward and the backward communication holes at least in the front joint disk are arranged at an equal distance in the peripheral direction of the opposing face.

A second aspect of the present invention is the rotary shaft device according to the first aspect in which a ring-shaped middle seal separates the inner space and the outer space, and being projectingly arranged concentrically with the inner seal and the outer seal at least in either of the faces opposing with each other.

A third aspect of the present invention is the rotary shaft device according to the second aspect in which the middle seal is arranged to project less than the inner seal and the outer seal so as to form a gap through which the inner space and the outer space communicate with each other in the pressing state.

A fourth aspect of the present invention is the rotary shaft device according to the third aspect in which the gap is variable according to the number of revolution of the rotary shaft.

A fifth aspect of the present invention is the rotary shaft device according to any of the preceding aspects in which the front joint disk is provided with a throttle mechanism reducing a flow passage cross-sectional area of the backward communication holes on the far side of the rotation center of the rotary shaft as the number of revolution of the rotary shaft increases.

A sixth aspect of the present invention is the rotary shaft device according to the fifth aspect in which the throttle mechanism is formed of a slide body and an energizing part. The slide body crosses the backward communication hole, and being slidable in the radial direction of the front joint disk. The energizing part energizes the slide body in the slide direction increasing the flow passage cross-sectional area.

A seventh aspect of the present invention is the rotary shaft device according to the first aspect in which the inner space and the outer space are formed so as to be united.

A eighth aspect of the present invention is the rotary shaft device according to the first aspect in which the rear end of at least either of the forward communication holes and the backward communication holes arranged in the front joint disk are arranged lower than a radial position of the reciprocating flow passages connected in the radial direction of the rotary shaft.

According to the first aspect of the present invention, the rotation balance is improved. Therefore, leakage hardly occurs because of arranging adjacently even if the rotary shaft provided with the reciprocating passages rotates at a high speed.

According to the second aspect of the present invention, leakage of fluid can be prevented more effectively in addition to the effect of the first aspect of the present invention.

According to the third aspect of the present invention, sealing resistance can be reduced even if the middle seal is provided. Further, an increase in the pressure of the outer space caused by the centrifugal force can be suppressed in addition to the effect of the second aspect.

According to the fourth aspect of the present invention, the pressure drop of the inner space and the pressure rise of the outer space caused by the centrifugal force with an increase in the number of revolution can be improved gradually in addition to the effect of the third aspect.

According to the fifth aspect of the present invention, the fluid pressure drop and changes in the flow rate inside the rotary shaft can be suppressed by adoption of the throttle mechanism in addition to the effect of either of the first to fourth aspect.

According to the sixth aspect of the present invention, it is available to easily and reasonably obtain the throttle mechanism operated by the centrifugal force generated by rotation of the rotary shaft in addition to the effect of the fifth aspect.

According to the seventh aspect of the present invention, the flow rate of the fluid to the reciprocating flow passages of the rotary shaft is increased. When the fluid is the cooling liquid, the heat transfer coefficient is increased. Therefore, cooling efficiency can be improved in addition to the effect of the first aspect.

According to the eighth aspect of the present invention, the fluid can be supplied to the reciprocating passages stably without disturbing flow-in by cavitation, and leakage from the outer seal due to an increase in pressure at an outlet can be prevented in addition to the effect of the first aspect.

DETAILED DESCRIPTION OF THE INVENTION

Figure 1:
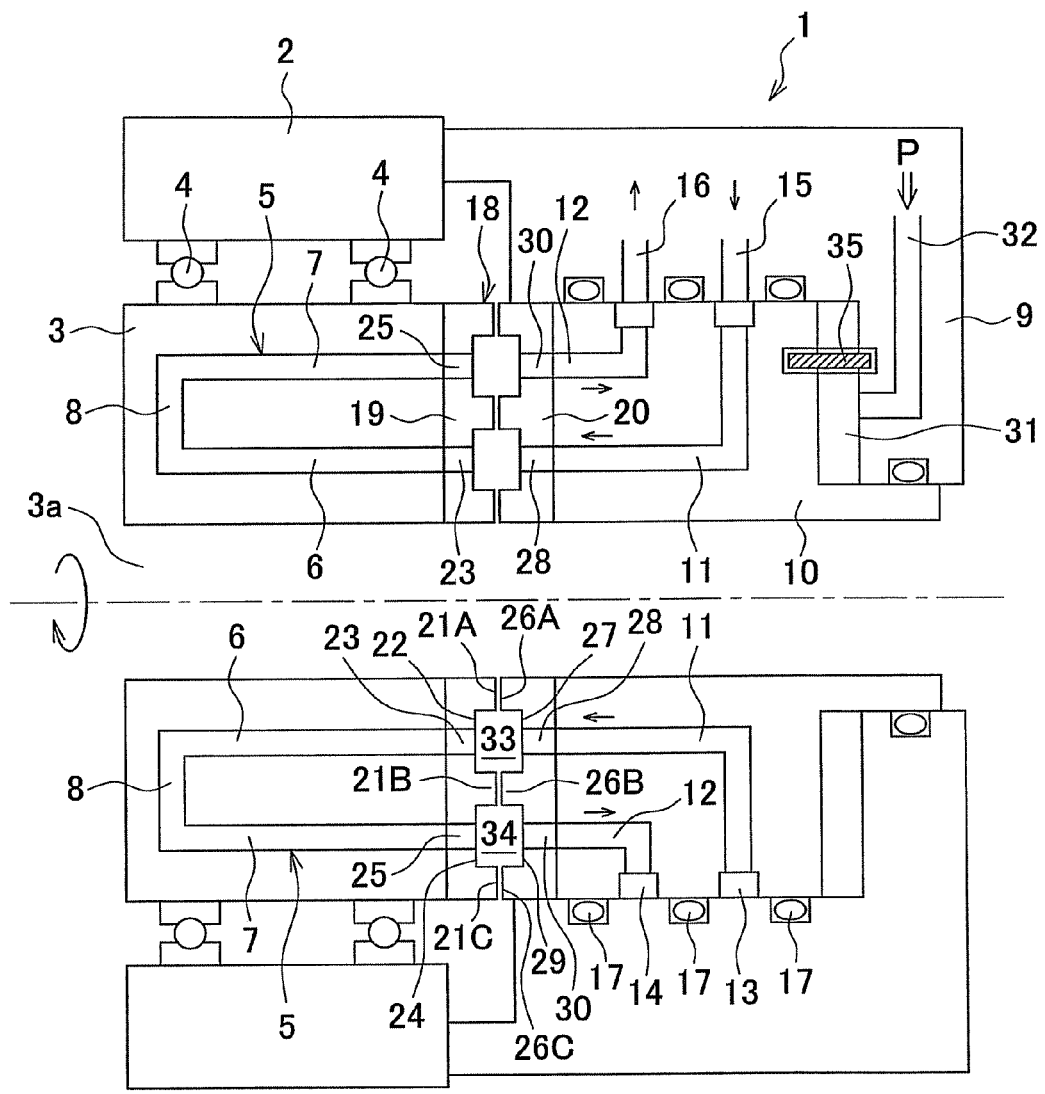
FIG. 1 is a vertical cross-sectional view of a rotary shaft device.

Embodiments in relation with the present invention will be described below referring to the drawings.

FIG. 1 is a vertical cross-sectional view showing an example of a rotary shaft device used for a main spindle of a machine tool. The rotary shaft device 1 includes a rotary shaft 3 rotatably supported by a housing 2 through front and rear ball bearings 4, 4 and rotatably driven by a motor not shown. In the axis of the rotary shaft 3, an accommodation hole 3a is formed for a draw bar operating a chuck device, and arranged in the end of the rotary shaft 3.

Further, inside the rotary shaft 3, reciprocating flow passages 5 for cooling liquid are formed. The reciprocating flow passage 5 is formed in a horizontal U-shape composed of a forward passage 6, a backward passage 7 and a connection passage 8. The forward passage 6 is in parallel with the axis of the rotary shaft 3, and positioned on the near side of the axis. The backward passage 7 is also in parallel with the axis, and positioned on the far side of the axis. The connection passage 8 extends in the radial direction and connects the front ends (the left side in FIG. 1 is to be referred to as the front side) of the forward passage 6 and the backward passage 7, and is arranged by a plural number at an equal distance in the peripheral direction.

Further, a cylinder 9 is connected to the rear part of the housing 2, and a piston 10 is held in the center of the cylinder 9. Inside the piston 10, a plurality of L-shape inner flow passages 11 are formed on the concentric circle with the forward passages 6 of the rotary shaft 3 in parallel with the axis. The rear ends of the inner flow passages 11 are bent to extend in the radial direction. A plurality of L-shape outer flow passages 12 are formed on the concentric circle with the backward passages 7 of the rotary shaft 3 in parallel with the axis. The rear ends of the outer flow passages 12 are bent to extend in the radial direction. The rear ends of the inner flow passages 11 are connected to a rear annular groove 13 circumferentially arranged in the outer periphery of the piston 10, and the rear ends of the outer flow passages 12 are connected to a front annular groove 14 circumferentially arranged in the outer periphery of the piston 10 respectively.

Further, in the cylinder 9, an inward flow passage 15 and an outward flow passage 16 are formed so that the inward flow passage 15 is connected to the rear annular groove 13, and the outward flow passage 16 is connected to the front annular groove 14. The inward passage 15 and the outward passage 16 are connected respectively to a cooling liquid supply device not shown. 17, 17, . . . are O-rings disposed in front and back of respective annular grooves 13, 14, and sealing the gap between the cylinder 9 and the piston 10.

Figure 2A:
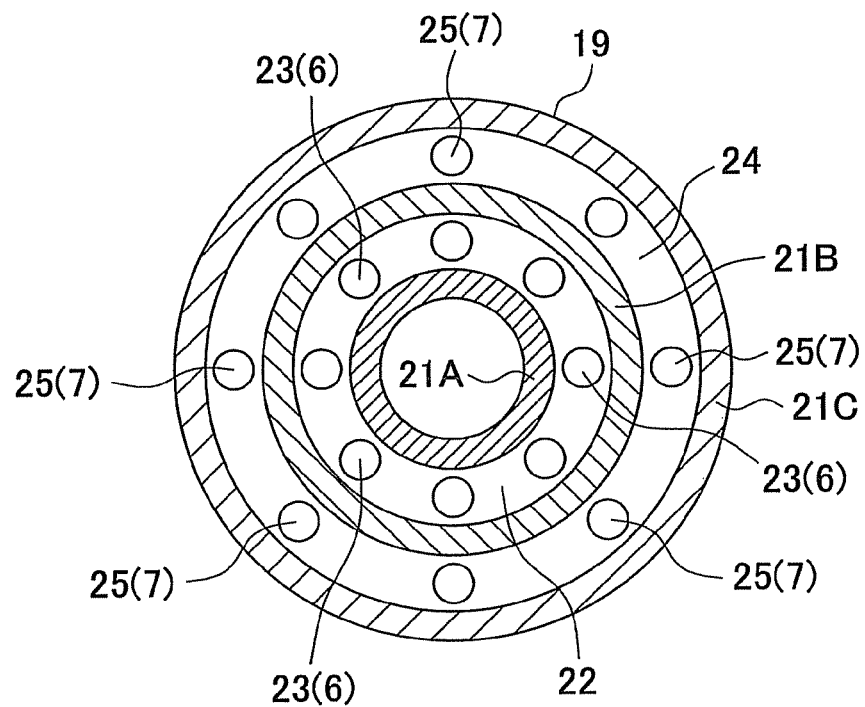
FIG. 2A is an explanatory drawing showing the end face of a front joint disk.

Further, a rotary joint 18 is arranged between the rotary shaft 3 and the piston 10. The rotary joint 18 is composed of a front joint disk 19 and a rear joint disk 20. The front joint disk 19 is fixed to the rear end face of the rotary shaft 3, and the rear joint disk 20 is fixed to the front end face of the piston 10. In the front joint disk 19, an inner seal 21A, a middle seal 21B and an outer seal 21C are formed as ring-shaped projections. The inner seal 21A positioned innermost in the radial direction and an outer seal 21C positioned outermost are projectingly arranged concentrically respectively, as shown in FIG. 2A. Further, the middle seal 21B positioned between the inner seal 21A and the outer seal 21C is projectingly arranged concentrically as well.

Further, forward communication holes 23, 23, . . . concentrically communicating with the forward passages 6 of the reciprocating flow passages 5 are formed in a groove 22 provided between the inner seal 21A and the middle seal 21B. Whereas, backward communication holes 25, 25, . . . concentrically communicating with the backward passages 7 of the reciprocating flow passages 5 are formed in a groove 24 provided between the middle seal 21B and the outer seal 21C.

Here, with respect to the reciprocating passages 5, the forward passages 6 and the backward passages 7 are arranged at an equal distance in the peripheral direction, and positioned on straight lines in the radial direction of the rotary shaft 3. Therefore, the forward communication holes 23 and the backward communication holes 25 are arranged at an equal distance in the peripheral direction as shown in FIG. 2A.

Figure 2B:
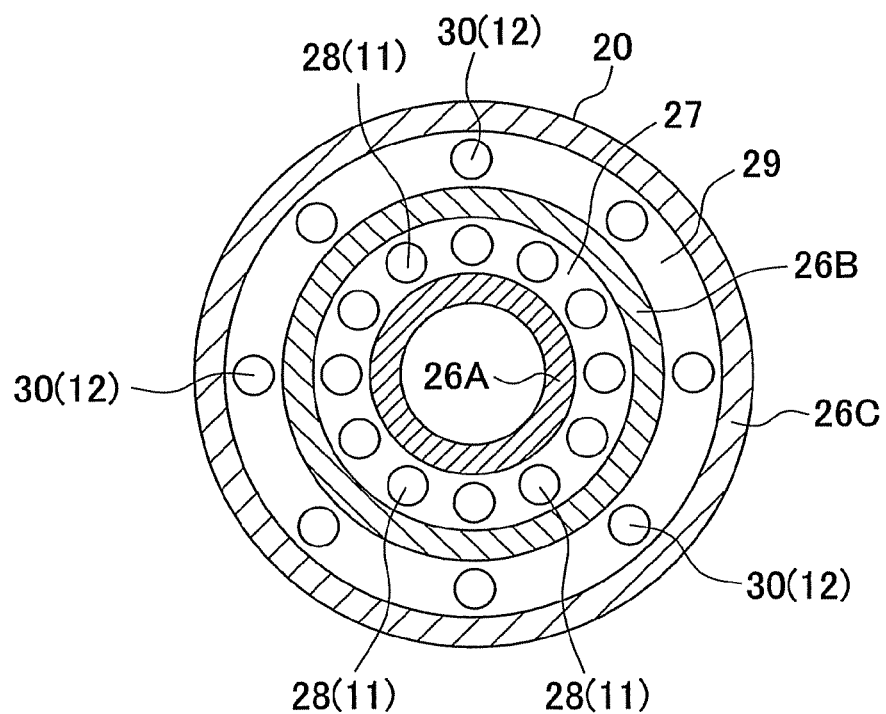
FIG. 2B is an explanatory drawing showing the end face of a rear joint disk.

On the other hand, in the rear joint disk 20, an inner seal 26A, a middle seal 26B and an outer seal 26C are formed as ring-shaped projections. The inner seal 26A positioned innermost in the radial direction and an outer seal 26C positioned outermost are projectingly arranged concentrically respectively, as shown in FIG. 2B. The middle seal 26B positioned between the inner seal 26A and the outer seal 26C is projectingly arranged concentrically as well. Further, forward communication holes 28, 28 . . . concentrically communicating with the inner flow passages 11 are formed in a groove 27 provided between the inner seal 26A and the middle seal 26B. Whereas, backward communication holes 30, 30, . . . concentrically communicating with the outer flow passages 12 are formed in a groove 29 provided between the middle seal 26B and the outer seal 26C.

Here, the number of the forward communication holes 28 (the inner flow passages 11) are more than that of the backward communication holes 30 (the outer flow passages 12). In addition, each forward communication hole 28 and the backward communication hole 30 are arranged at an equal distance in the peripheral direction inside the respective grooves 27, 29.

Further, a cylinder chamber 31 is provided behind the piston 10, and forms a pressing part to press the piston 10 forward by means of supplying the fluid of a predetermined pressure P from the outside through a supply passage 32 formed in the cylinder 9. As a result, the rear joint disk 20 presses against the front joint disk 19. In the pressing state, the inner seals 21A, 26A, the middle seals 21B, 26B, and the outer seals 21C, 26C are made to abut upon each other to seal the inner and outer peripheries and the middle of both the joint disks 19, 20. As a result, a ring-shaped inner space 33 can be formed by the opposing grooves 22, 27, and a ring-shaped outer space 34 can be formed by the opposing grooves 24, 29 respectively. A reference numeral 35 is a rotation preventing pin whose ends are inserted into the piston 10 and the cylinder 9 with play.

In the rotary shaft device 1 constituted as described above, the rear joint disk 20 presses against the front joint disk 19 by means of supplying the fluid to the cylinder chamber 31 in a state of rotation of the rotary shaft 3, wherein the cooling liquid enters the inner space 33 from the respective inner flow passages 11 through the respective forward communication holes 28 of the rear joint disk 20 if the cooling liquid supplied to the inward flow passage 15 from the supply device. Further, the cooling liquid enters the respective reciprocating flow passages 5 from the respective forward communication holes 23, 23 of the front joint disk 19, passes the forward passages 6, and the connection passages 8, the backward passages 7 in order, and thereby cools the rotary shaft 3.

Thereafter, the cooling liquid enters the outer space 34 through the respective backward communication holes 25 of the front joint disk 19, passes the respective outer flow passages 12 through the respective backward communication holes 30 of the rear joint disk 20, and returns to the supply device from the outward flow passage 16.

At this time, the cooling liquid can be delivered stably from the rear joint disk 20 to the front joint disk 19, even if the front joint disk 19 rotates at a high speed along with the rotary shaft 3. This is because the reciprocating flow passages 5 in the rotary shaft 3 as well as the forward communication holes 23 and the backward communication holes 25 of the front joint disk 19 in the rotary joint 18 are arranged at an equal distance in the peripheral direction. Here, in particular, the rotation balance is improved further because the forward communication holes 28 and the backward communication holes 30 are arranged with good balance in the peripheral direction in the grooves 27 and 29 respectively in the rear joint disk 20.

Thus, according to the rotary shaft device 1 of the configuration described above, the ring-shaped inner seals 21A, 26A and the ring-shaped outer seals 21C, 26C are projectingly arranged, and are concentric with the faces of the front joint disk 19 and the rear joint disk 20 respectively. The ring-shaped inner seals 21A, 26A abuts upon each other on the axis side of the opposing faces, and the ring-shaped outer seals 21C, 26C abuts upon each other on the outer periphery side of the opposing faces in the pressing state caused by the pressing part. The ring-shaped inner space 33 communicates with the forward communication holes 23, 28 and the ring-shaped outer space 34 communicates with the backward communication holes 25, 30. Further, the ring-shaped inner space 33 and the ring-shaped outer space 34 are adjacently arranged concentrically between the inner seals 21A, 26A and the outer seals 21C, 26C. The forward communication holes 23 and the backward communication holes 25 in the reciprocating flow passages 5 and the front joint disk 19 are arranged at an equal distance in the peripheral direction of the opposing faces. Therefore, the rotation balance is improved, and leakage hardly occurs because of the arrangement of the forward communication holes 23 and the backward communication holes 25, even if the rotary shaft 3 provided with the reciprocating passages 5 rotates at a high speed.

In particular, here, the ring-shaped middle seals 21B, 26B separating the inner space 33 and the outer space 34 are arranged adjacently concentrically with the inner seals 21A, 26A and the outer seals 21C, 26C on the faces of the front joint disk 19 and the rear joint disk 20 opposing with each other. Therefore, leakage of the cooling liquid can be prevented more effectively.

Other embodiments will be described below. Because the constitution other than the rotary joint is similar to that shown in FIG. 1, the rotary joint will be mainly described. Further, the drawings shown in respective variants show the upper side of the rotary joint.

Figure 3:
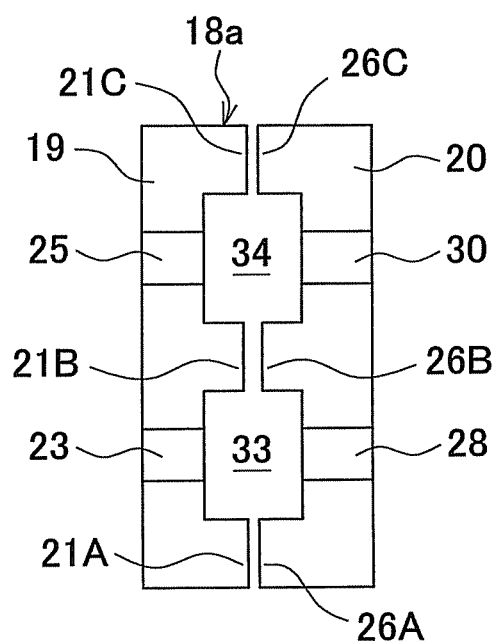
FIG. 3 is an explanatory drawing for a variant of a rotary joint.

In a rotary joint 18a shown in FIG. 3, the middle seals 21B, 26B are arranged to project slightly less than other seals so as to reserve some gap between the front and rear middle seals 21B, 26B in a pressing state of the rear joint disk 20.

As mentioned above, when the middle seals 21B, 26B are arranged to project less than the inner seals 21A, 26A and the outer seals 21C, 26C so as to form the gap through which the inner space 33 and the outer space 34 communicate with each other in the pressing state, sealing resistance can be reduced even if the middle seals 21B, 26B are provided. Further, the pressure of the outer space 34 caused by the centrifugal force can be increased gradually.

Figure 4:
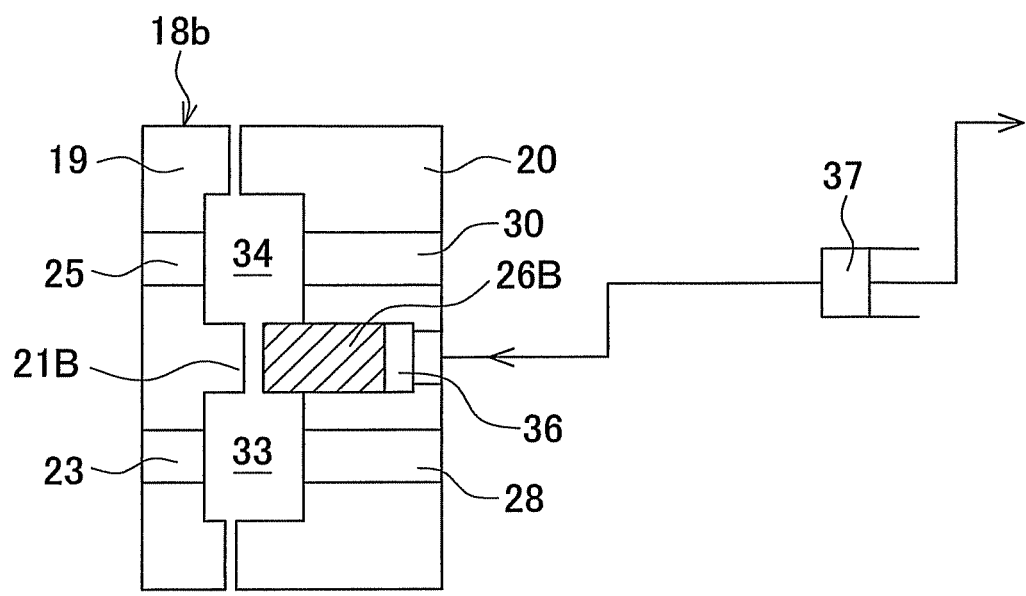
FIG. 4 is an explanatory drawing for a variant of the rotary joint.

In a rotary joint 18b shown in FIG. 4, the middle seal 26B of the rear joint disk 20 side is made a separate body and arranged so as to move forward and backward with respect to the rear joint disk 20. An actuator, such as a hydraulic cylinder 37 and the like, is connected to a cylinder chamber 36 arranged behind the middle seal 26B so as to change the projection position according to the number of revolution of the rotary shaft 3.

When the gap formed by the middle seals 21B, 26B is made variable according to the number of revolution of the rotary shaft 3, the sealing resistance can be reduced. Moreover, the pressure drop of the inner space 33 and an increase in the pressure of the outer space 34 caused by the centrifugal force can be suppressed when the number of revolution increases. Further, the middle seal to be moved may be provided in the front joint disk.

Figure 5:
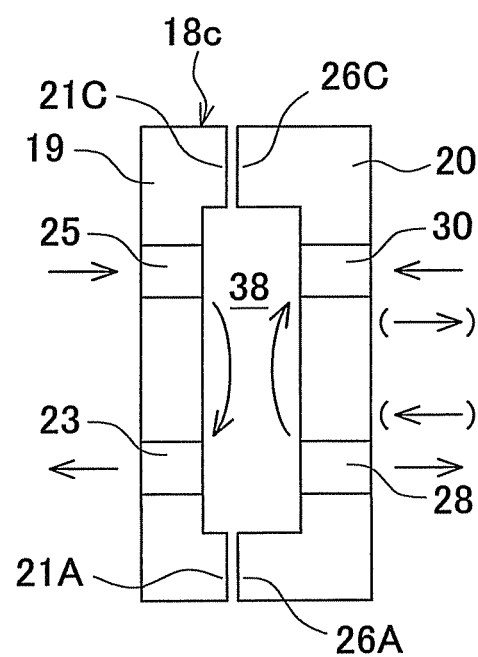
FIG. 5 is an explanatory drawing for a variant of the rotary joint.

In a rotary joint 18c shown in FIG. 5, a ring-shaped united space 38 is formed and units the inner space and the outer space by eliminating the middle seal. Further, in this case, with respect to the forward communication holes 28 and the backward communication holes 30 of the rear joint disk 20, the forward flow side and the backward flow side of the fluid may be reversed.

With this configuration, the flow rate of the cooling liquid to the reciprocating flow passages 5 of the rotary shaft 3 can be increased. Therefore, due to an increase in the heat transfer coefficient to the cooling liquid, the cooling efficiency can be improved.

Figure 6A:
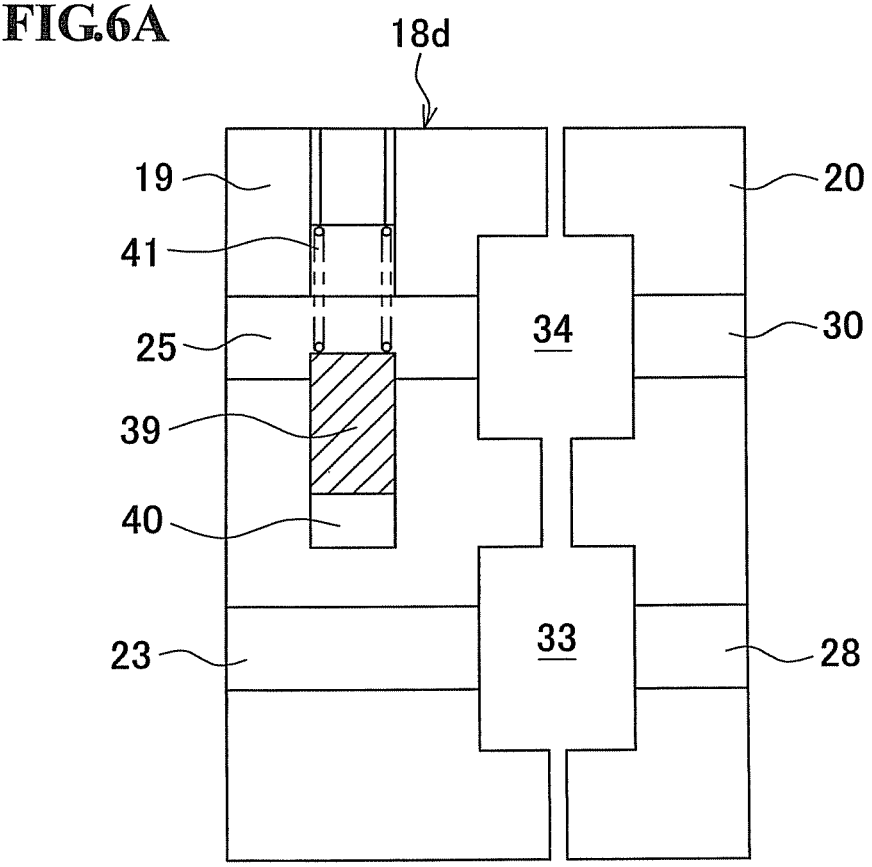
FIG. 6A is an explanatory drawing for a variant of the rotary joint.
Figure 6B:
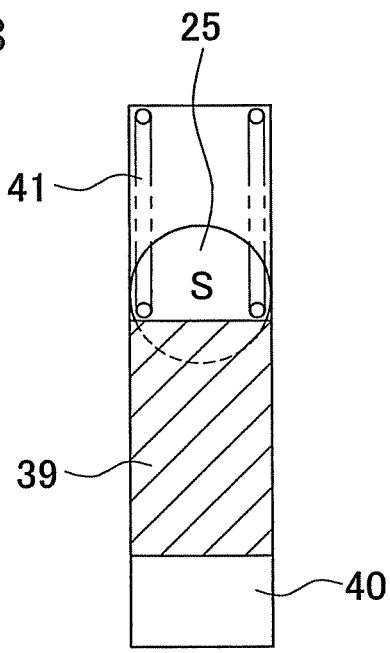
FIG. 6B is an explanatory drawing for a throttle mechanism.

In a rotary joint 18d shown in FIGS. 6A and 6B, an accommodation part 40 is continuously arranged on the rotation center side in the backward communication holes 25 on the far side from the rotation center of the front joint disk 19. The accommodation part 40 accommodates a slide body 39, which is slidable in the radial direction. A coil spring 41 is arranged as an energizing part energizing the slide body 39 from the outside in the radial direction toward the accommodation part 40 side so as to form a throttle mechanism.

With this throttle mechanism, when the number of revolution of the rotary shaft 3 increases, the slide body 39 moves to the direction projecting from the accommodation part 40 resisting the energizing force of the coil spring 41 generated by the centrifugal force. As a result, the flow passage cross-sectional area S of the backward communication holes 25 is reduced.

By providing the above mentioned throttle mechanism reducing the flow passage cross-sectional area S of the backward communication holes 25 on the far side of the rotation center of the rotary shaft 3 in accordance with an increase in the number of revolution of the rotary shaft 3 in the front joint disk 19, the fluid pressure drop and changes in the flow rate inside the rotary shaft 3 can be suppressed. In particular, here, the throttle mechanism is formed of the slide body 39 and the coil spring 41, which is operated by the centrifugal force generated by rotation of the rotary shaft 3. Therefore, the throttle mechanism can be obtained easily and in a rational manner.

Further, with respect to the energizing part, other structures such as a tension spring and the like can be adopted so as to pull and energize the slide body toward the rotation center side.

Further, not only by adopting such throttle mechanism, but also by setting the total fluid resistance of the backward passages on the far side of the rotation center in the reciprocating flow passages and the backward communication holes communicating with the backward passages higher than the total fluid resistance of the forward passages on the near side of the rotation center and the forward communication holes communicating with the forward passages, the fluid pressure drop and changes in the flow rate inside the rotary shaft 3 can be suppressed. More specifically, it can be achieved by making the hole diameter of the flow passages and the communication holes of the former smaller than the hole diameter of the flow passages and the communication holes of the latter, by making the number of the flow passage and the communication hole less, or by making the length of the flow passages and the communication holes longer.

Figure 7:
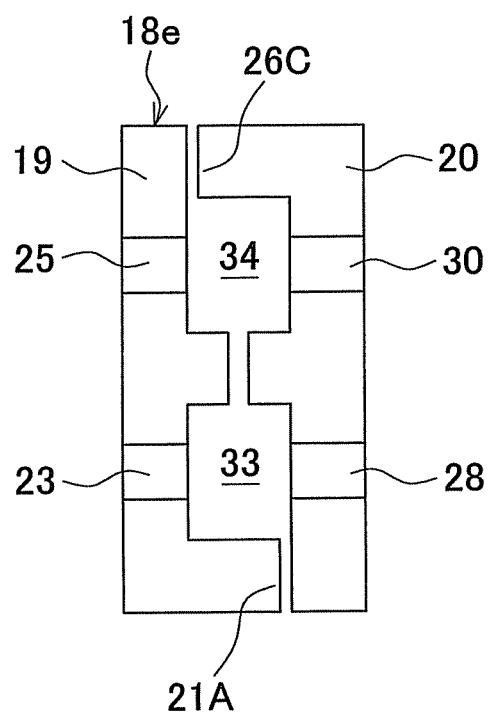
FIG. 7 is an explanatory drawing for a variant of the rotary joint.

Furthermore, the outer seal and the inner seal are not required to be arranged in both the front joint disk and the rear joint disk, and may be arranged only in either of them as shown in a rotary joint 18e shown in FIG. 7. The same is true with respect to the middle seal, and it is not necessary to projectingly arrange it in both.

Figure 8:
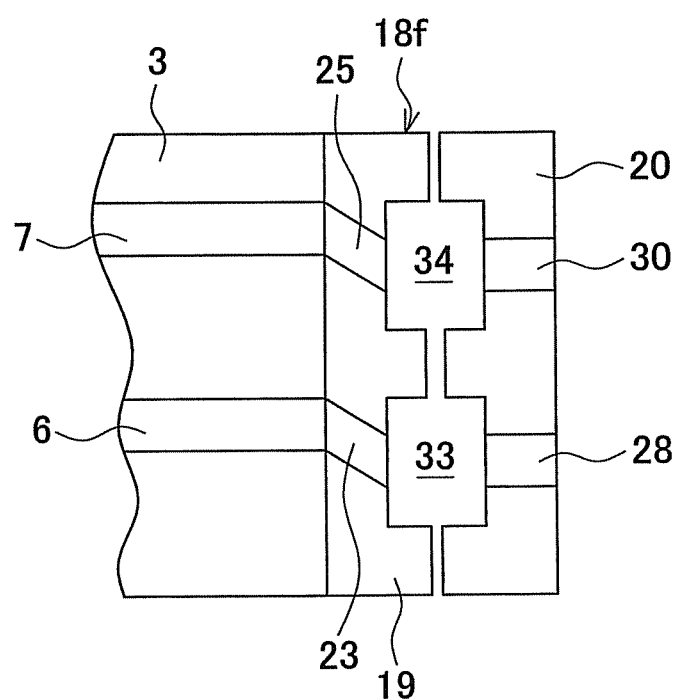
FIG. 8 is an explanatory drawing for a variant of the rotary joint.
Figure 9:
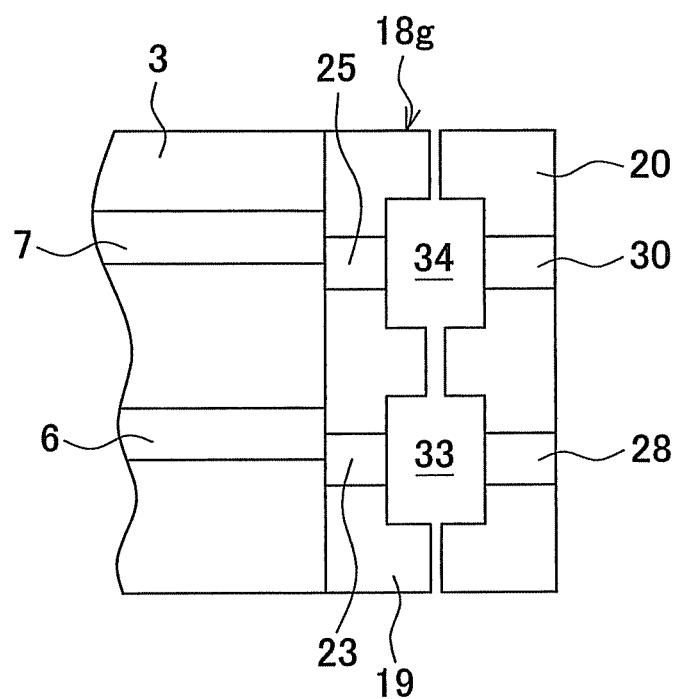
FIG. 9 is an explanatory drawing for a variant of a connection part of communication holes and reciprocating passages of a rotary joint.
Figure 10:
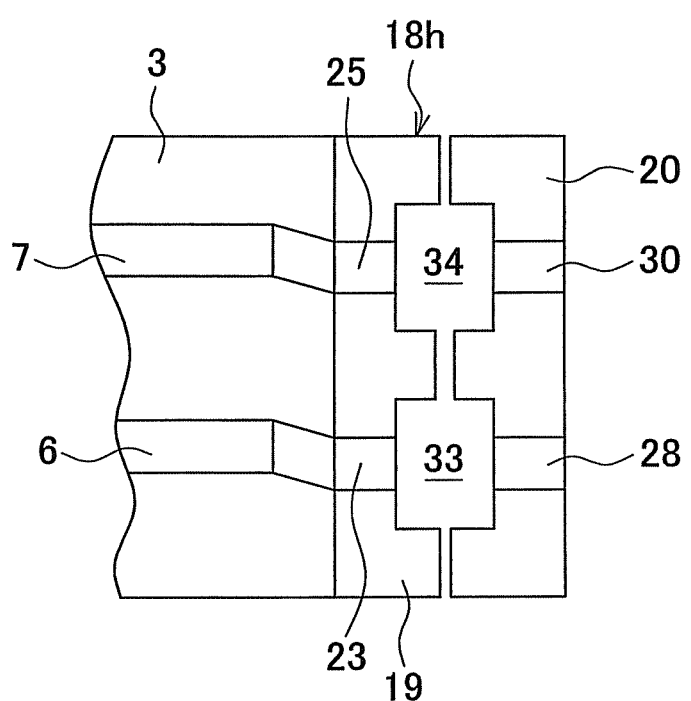
FIG. 10 is an explanatory drawing for a variant of the reciprocating passages.

On the other hand, in the rotary shaft devices shown in FIG. 8 to FIG. 10, the rear end of the communication holes arranged in the front joint disk is arranged less than the radial position of the reciprocating flow passages (the position in a radius smaller than said radius) in the radial direction of the rotary shaft. Therefore, the fluid can be supplied to the reciprocating passages stably without disturbing flow-in by cavitation, and leakage from the outer seal caused by an increasing in the pressure at an outlet can be prevented.

More specifically, a rotary joint 18f shown in FIG. 8 has the constitution in which the communication holes 23, 25 formed in the front joint disk 19 are inclined inward respectively in the radial direction of the rotary shaft 3 so that the rear ends on the inner space 33 and the outer space 34 side are in the positions with smaller diameter than the radial position of the forward passages 6 and the backward passages 7 with respect to the front ends communicating with the forward passages 6 and the backward passages 7. A rotary joint 18g shown in FIG. 9 has the constitution in which the centers of the communication holes 23, 25 parallel with the axis of the rotary shaft 3 are arranged so as to shift to the smaller radius side in the radial direction of the rotary shaft 3 with respect to the centers of the forward passages 6 and the backward passages 7. A rotary joint 18h shown in FIG. 10 has the constitution in which the rear ends of the forward passages 6 and the backward passages 7 are inclined to the smaller radius side in the radial direction of the rotary shaft 3 and are connected respectively to the communication holes 23, 25 parallel with the axis of the rotary shaft 3.

Further, with respect to these constitutions, it is not necessary to apply the same constitution to both of the forward communication holes and the backward communication holes. The constitution may be arranged in either one only of the forward communication holes and the backward communication holes, or the constitution applied may be different between the forward communication holes and the backward communication holes.

Further, other structures of the rotary shaft device are not limited to the configurations described above. For example, it is also possible to reverse the forward passages and the backward passages in the reciprocating flow passages, to use an elastic body such as a coil spring, a disk spring and the like, and to utilize the pressure of the fluid itself flowing through the reciprocating passages for the pressing part for the rear joint disk. It is a matter of course that it is also available to adopt the rotary joint for a rotary shaft other than the main spindle.

Further, in the configurations described above, the forward communication holes and the backward communication holes are arranged at an equal distance in the peripheral direction in both of the front joint disk and the rear joint disk of the rotary joint in addition to the reciprocating flow passages of the rotary shaft. However, the rotation balance is improved as far as the flow passages and the communication holes are arranged at an equal distance at least in the reciprocating flow passages and the front joint disk. Therefore, equal arrangement may not be applied for the rear joint disk.

Furthermore, the reciprocating flow passage is not limited to the structure of arranging inside the rotary shaft. For example, the gap between the draw bar and the accommodation hole may be used for the forward passage, or a sleeve may be inserted into the accommodation hole, and the gap between the inner surface of the accommodation hole and the outer surface of the sleeve may be made the forward passage or the backward passage. Further, the plural reciprocating flow passages are made one set, and plural sets may be arranged at an equal distance, or combinations thereof are also applicable.

In addition, the front joint disk or the rear joint disk is not limited to a part formed of one body. For example, it may be a part in which the forward communication hole side and the backward communication hole side are separated respectively.

What is claimed is:

1. A rotary shaft device comprising a rotary joint including a front joint disk arranged in a rear end face of a rotary shaft provided with reciprocating flow passages and a rear joint disk that moves forward along an axis of the rotary shaft and is pressed against the front joint disk by a pressing part at a predetermined pressure, the front joint disk and the rear joint disk being provided with a plurality of forward communication holes connected to a forward passage side of the reciprocating flow passages and a plurality of backward communication holes connected to a backward passage side of the reciprocating flow passages respectively, wherein a ring-shaped inner seal is projectingly arranged in an axial direction of the rotary shaft on at least one of a face of the front joint disk and a face of the rear joint disk opposing each other, which abuts upon the opposing end face on the axis side of the disk in the pressing state by the pressing part, a ring-shaped outer seal is projectingly arranged in the axial direction of the rotary shaft on at least one of the opposing end faces, which abuts upon the opposing end face of the other disk on the outer periphery side of the disk in the pressing state and is positioned concentrically with the inner seal, a ring-shaped inner space communicates with one of the forward communication holes and the backward communication holes and a ring-shaped outer space communicates with one of the backward communication holes and the forward communication holes, wherein the ring-shaped inner space and the ring-shaped outer space are adjacently arranged concentrically with each other between the ring-shaped inner seal and the ring-shaped outer seal, which are projectingly arranged in the axial direction of the rotary shaft and abut upon the end face of the opposing disk, and the forward communication holes and the backward communication holes at least in the front joint disk are arranged at an equal distance in the peripheral direction of the opposing face.

2. The rotary shaft device according to claim 1, wherein a ring-shaped middle seal separating the inner space and the outer space is projectingly arranged in the axial direction of the rotary shaft and arranged concentrically with the inner seal and the outer seal at least in either of the faces opposing with each other.

3. The rotary shaft device according to claim 2, wherein the middle seal is arranged to project less than the inner seal and the outer seal so as to form a gap through which the inner space and the outer space communicate with each other in the pressing state.

4. The rotary shaft device according to claim 3, wherein the gap is variable according to the number of revolution of the rotary shaft.

5. The rotary shaft device according to claim 1, wherein the front joint disk is provided with a throttle mechanism reducing a flow passage cross-sectional area of the backward communication holes on the far side of the rotation center of the rotary shaft as the number of revolution of the rotary shaft increases.

6. The rotary shaft device according to claim 5, wherein the throttle mechanism is formed of a slide body crossing the backward communication hole and slidable in the radial direction of the front joint disk, and an energizing part energizing the slide body in the slide direction increasing the flow passage cross-sectional area.

7. The rotary shaft device according to claim 1, wherein the inner space and the outer space are formed so as to be united.

8. The rotary shaft device according to claim 1, wherein the rear end of at least either of the forward communication holes and the backward communication holes arranged in the front joint disk is arranged lower than a radial position of the reciprocating flow passages connected in the radial direction of the rotary shaft.

\* \* \* \* \*